Figure 1:
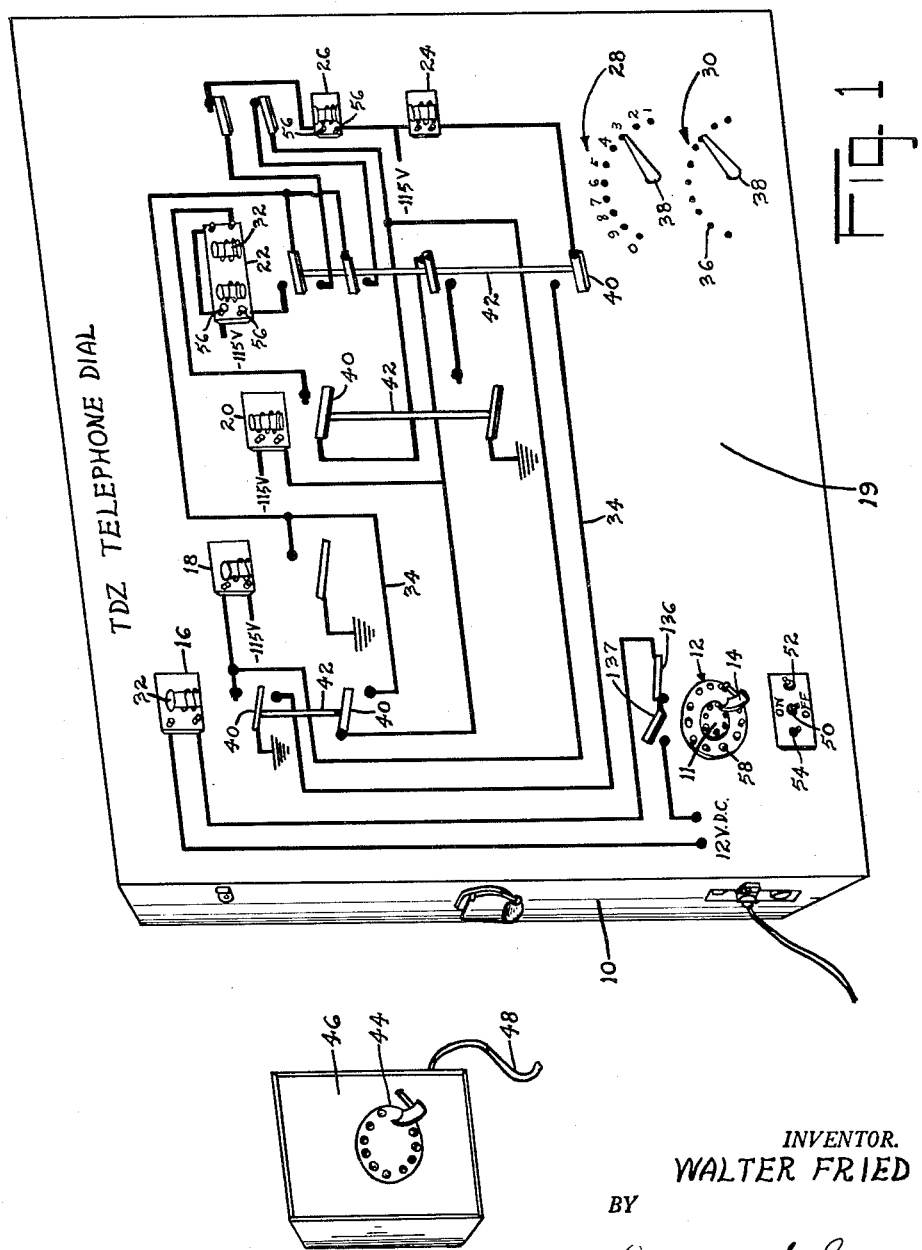

Aug. 7, 1962 W. FRIED 3,047,964
SIMULATED FUNCTIONAL-SYSTEM DEMONSTRATOR
Filed March 16, 1959 19 Sheets-Sheet 1

INVENTOR.
WALTER FRIED
BY
Lawrence S. Epstein
ATTORNEYS

INVENTOR.
WALTER FRIED

INVENTOR.
WALTER FRIED

Aug. 7, 1962 W. FRIED 3,047,964
SIMULATED FUNCTIONAL-SYSTEM DEMONSTRATOR
Filed March 16, 1959 19 Sheets-Sheet 5

INVENTOR.
WALTER FRIED
BY
Laurence S. Epstein
ATTORNEYS

Aug. 7, 1962 W. FRIED 3,047,964
SIMULATED FUNCTIONAL-SYSTEM DEMONSTRATOR
Filed March 16, 1959 19 Sheets-Sheet 6

INVENTOR.
*WALTER FRIED*
BY
*Lawrence S. Epstein*
ATTORNEYS

INVENTOR.
WALTER FRIED

Aug. 7, 1962 W. FRIED 3,047,964
SIMULATED FUNCTIONAL-SYSTEM DEMONSTRATOR
Filed March 16, 1959 19 Sheets-Sheet 9

INVENTOR.
WALTER FRIED
BY
Lawrence S. Epstein
ATTORNEYS

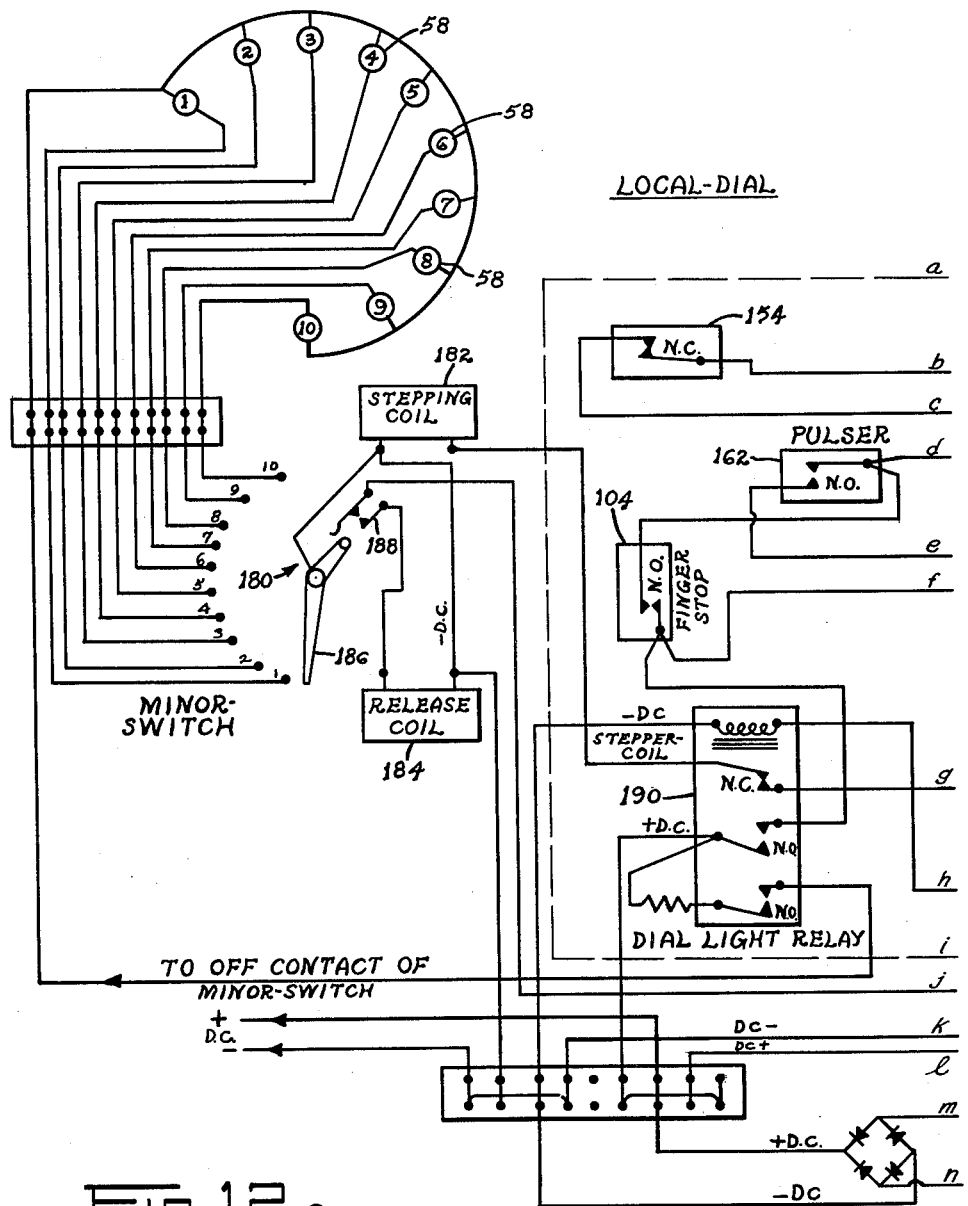

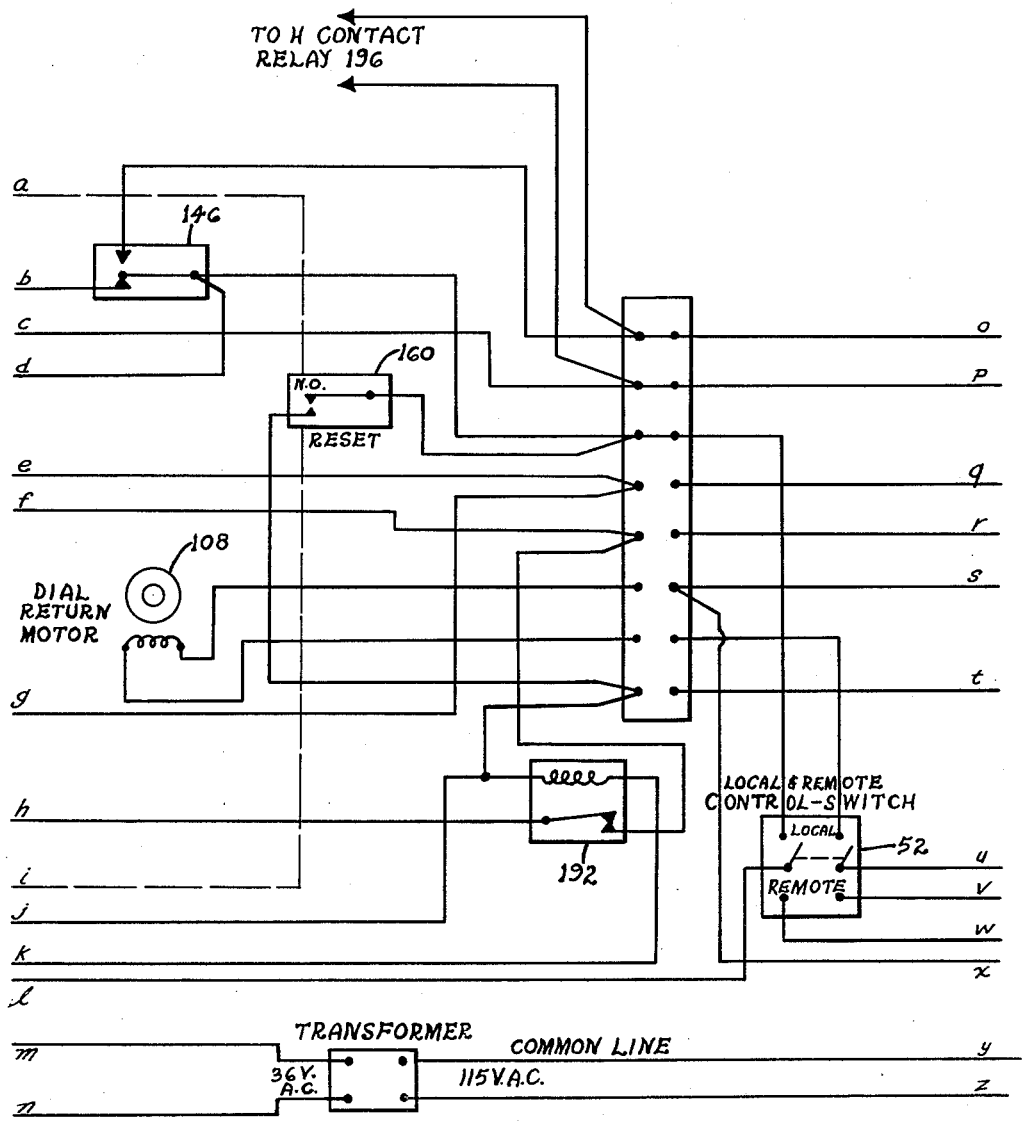

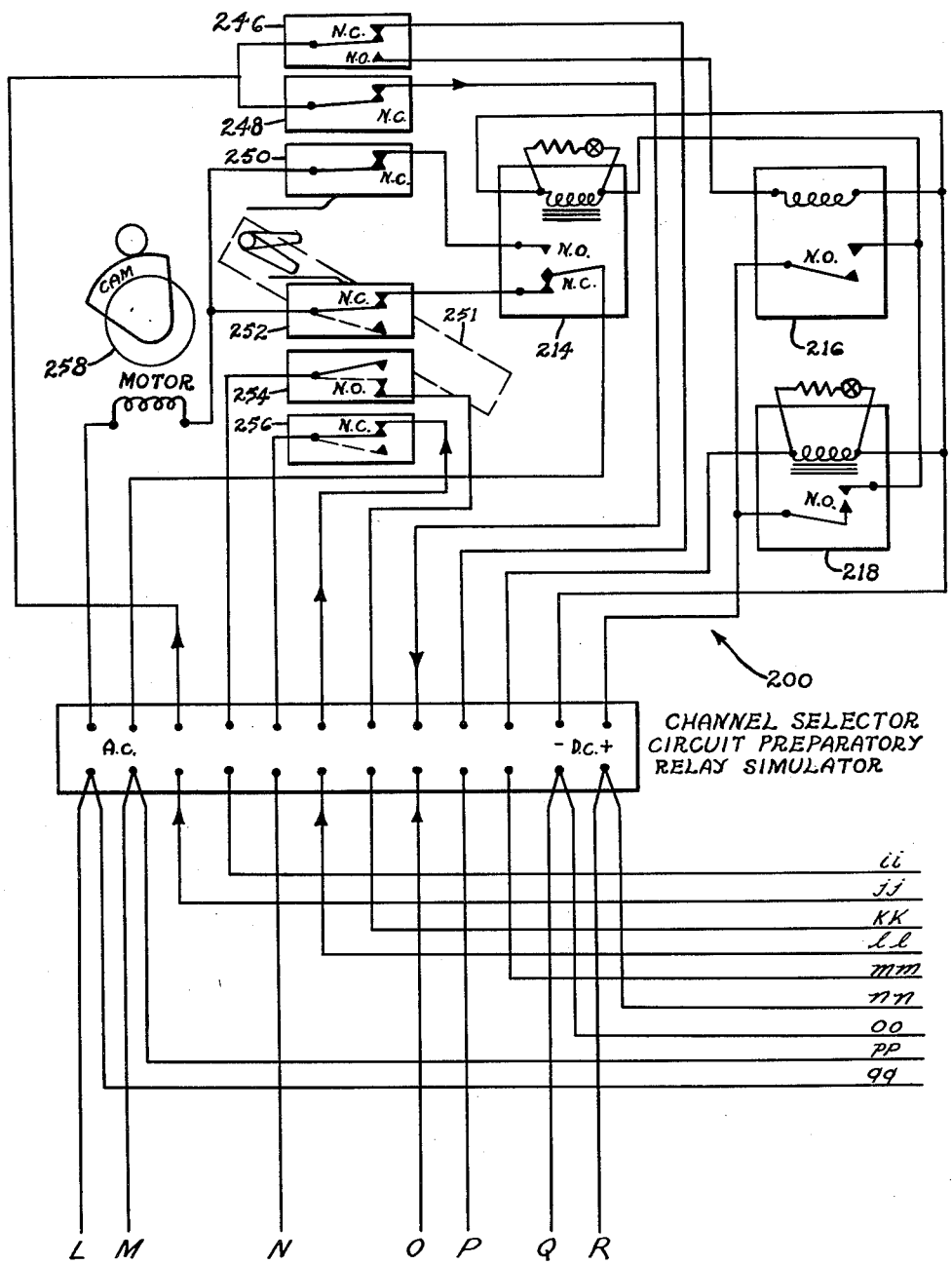

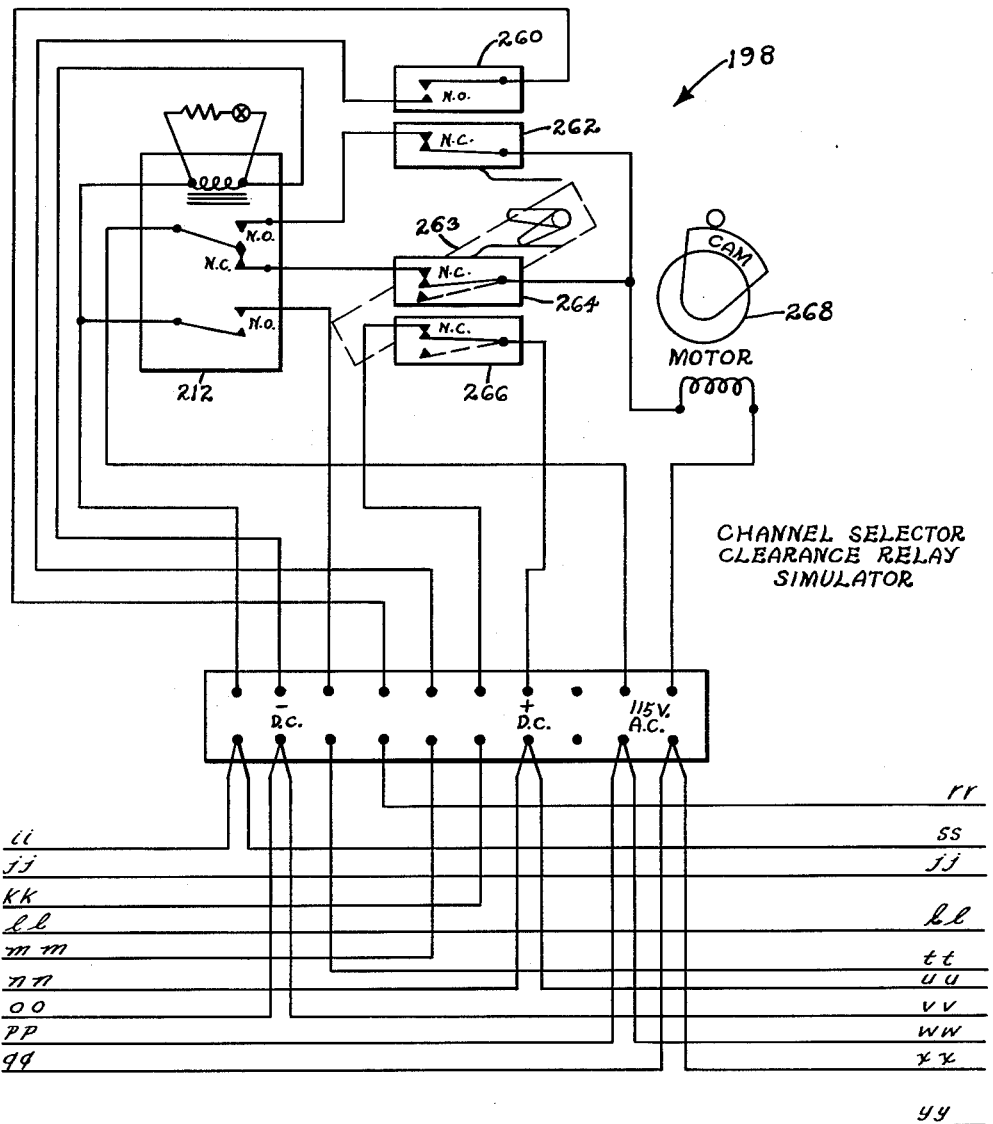

CHANNEL SELECTOR
TIMING RELAY
SIMULATOR

INVENTOR.
WALTER FRIED
BY
Lawrence S. Epstein
ATTORNEYS

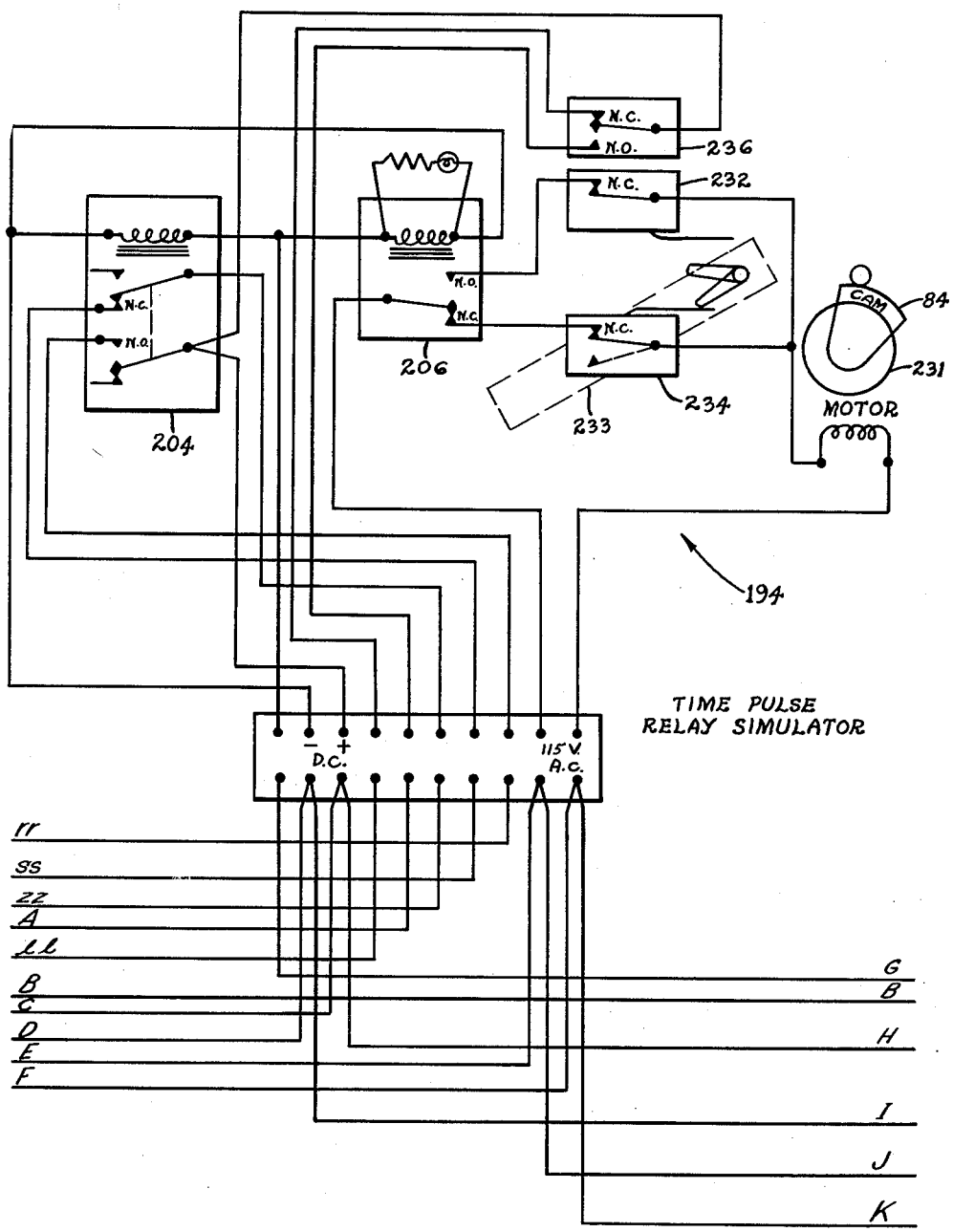

Aug. 7, 1962 W. FRIED 3,047,964
SIMULATED FUNCTIONAL-SYSTEM DEMONSTRATOR
Filed March 16, 1959 19 Sheets-Sheet 19

INVENTOR.
WALTER FRIED
BY
Lawrence S. Epstein
ATTORNEYS

3,047,964
Patented Aug. 7, 1962

3,047,964
SIMULATED FUNCTIONAL-SYSTEM
DEMONSTRATOR
Walter Fried, Huntington, N.Y., assignor, by mesne assignments, to the United States of America as represented by the Secretary of the Navy
Filed Mar. 16, 1959, Ser. No. 799,826
3 Claims. (Cl. 35—10)

This invention relates to a visual demonstrator and especially to a training device which simulates the components and structure of a functional system of a machine or other device and visually demonstrates the operation of the system.

In the process of training operators and maintenance technicians for mechanical and electrical devices and apparatus, it is frequently desirable for the students to observe the actual cooperative functioning of the elemental units and/or the component systems of the apparatus. This may be difficult to arrange in practice, since most apparatus is encased or contains components whose working parts are obscured.

For example, in teaching students the structural and operational details of a radio transmitter having an automatic frequency-channel selection system which is actuated by a telephone dial switch, it is highly advantageous to be able to visually demonstrate the sequence of operations and the action of components involved in changing the transmitter frequency.

The present invention comprises a device permitting visual demonstration of the structure and operation of a functional system. The device may consist of a panel which visibly supports elements simulating the component units forming a specific functional system in a given device, such as an automatic channel selection system in a radio transmitter.

These simulative elements may be pictorial or schematic representations, fabricated structures, or a combination of both of these. However, the operating parts of the components which the elements simulate comprise operative fabricated structures. Thus, the coil of a relay may be schematically represented but the moving parts are represented, for example, by fabricated levers and connecting links.

The connections between elements may be represented schematically or by fabricated structures. Thus, wires connecting various relays may be shown by colored paint lines, and the hydraulic lines in an automotive braking system may be illustrated by fluid-carrying plastic tubes.

Finally, mechanical or electrical components are provided to actuate the operative fabricated structures in simulation of the operation of the components in the actual functional system.

Another example of a specific application of this invention is in the visual demonstration, for the benefit of student mechanics, of the sequence of operations and the action of component units of the braking or ignition systems of an automobile.

An object of the invention is the visual demonstration of the operation of a functional system in a machine or other device.

Another object is the visual demonstration of the operation of the component units of a functional system.

A further object is the visual demonstration of the operation of an automatic channel selection system in a radio transmitter.

Yet another object is the visual demonstration of the operation of a functional system in a machine or other device by means of a schematic arrangement of simulated components.

Figure 2:
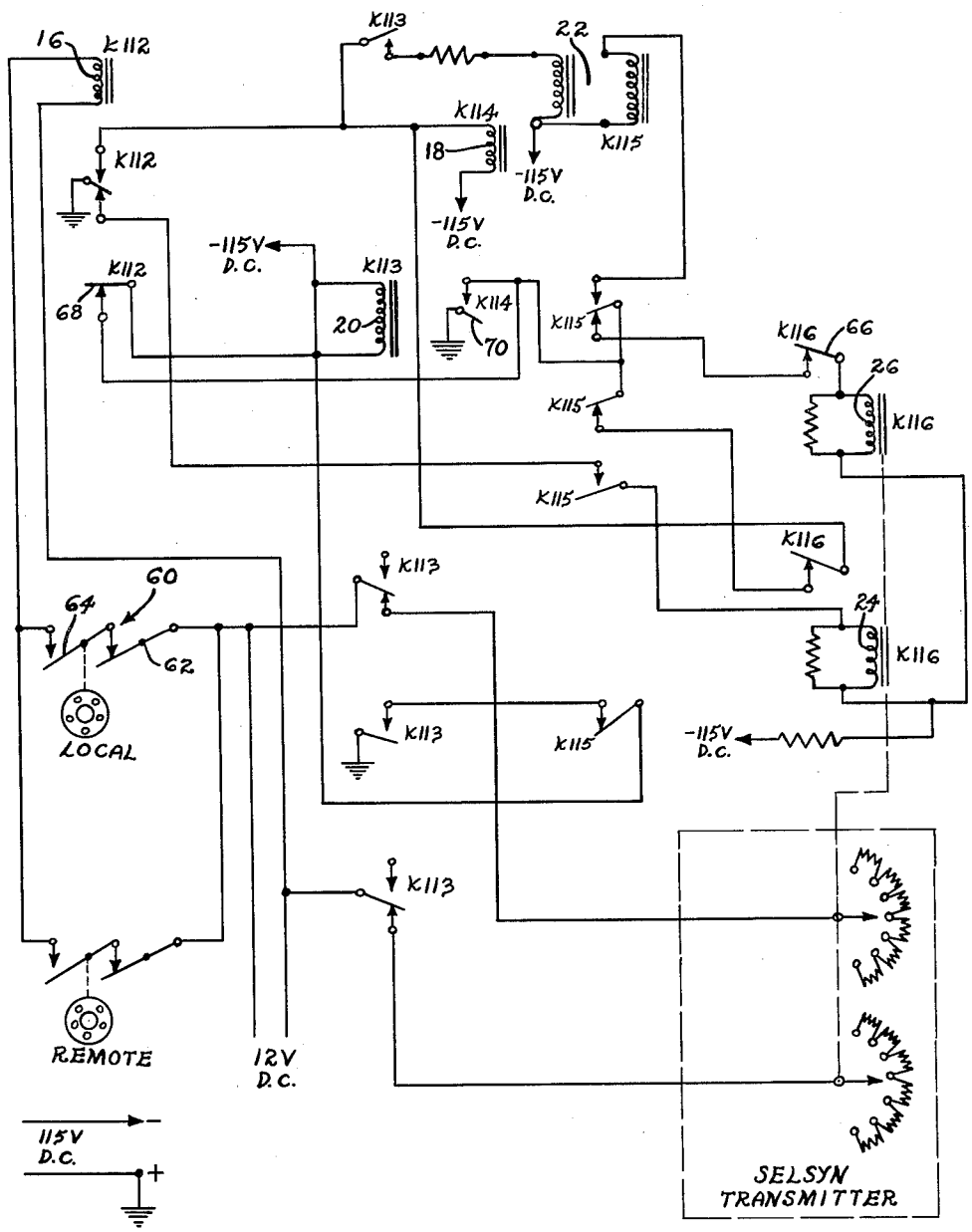
Figure 3:
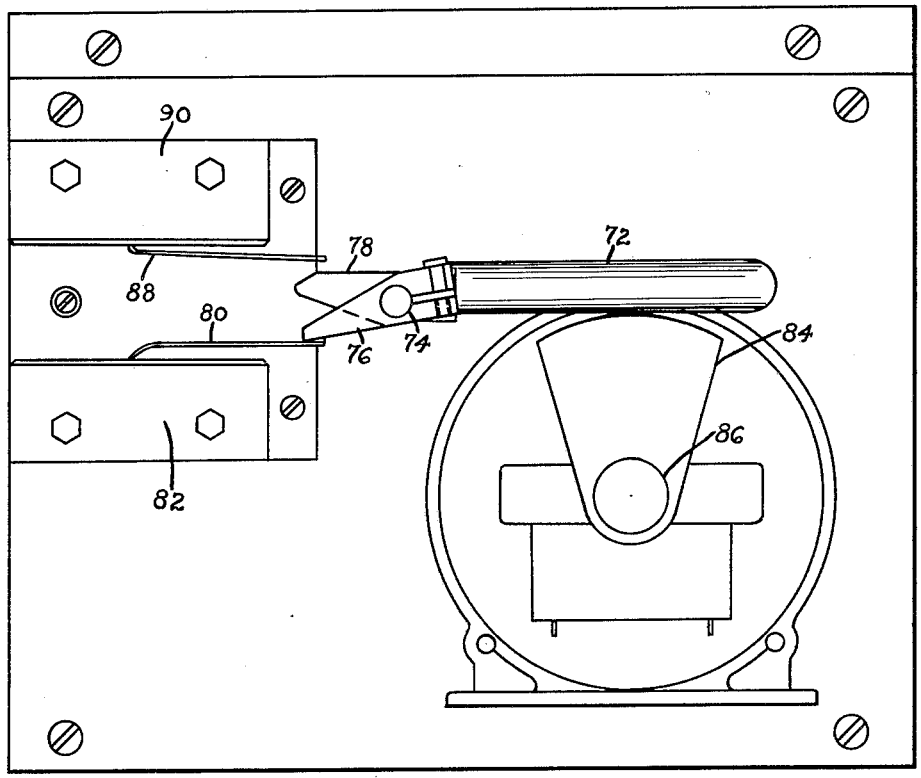
Figure 4:
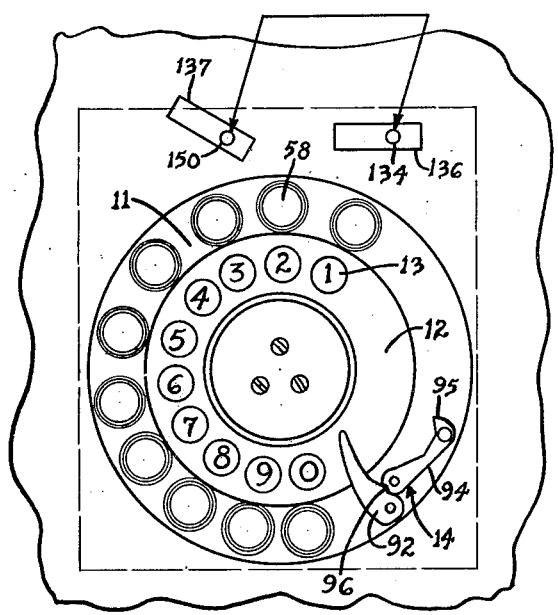
Figure 5:
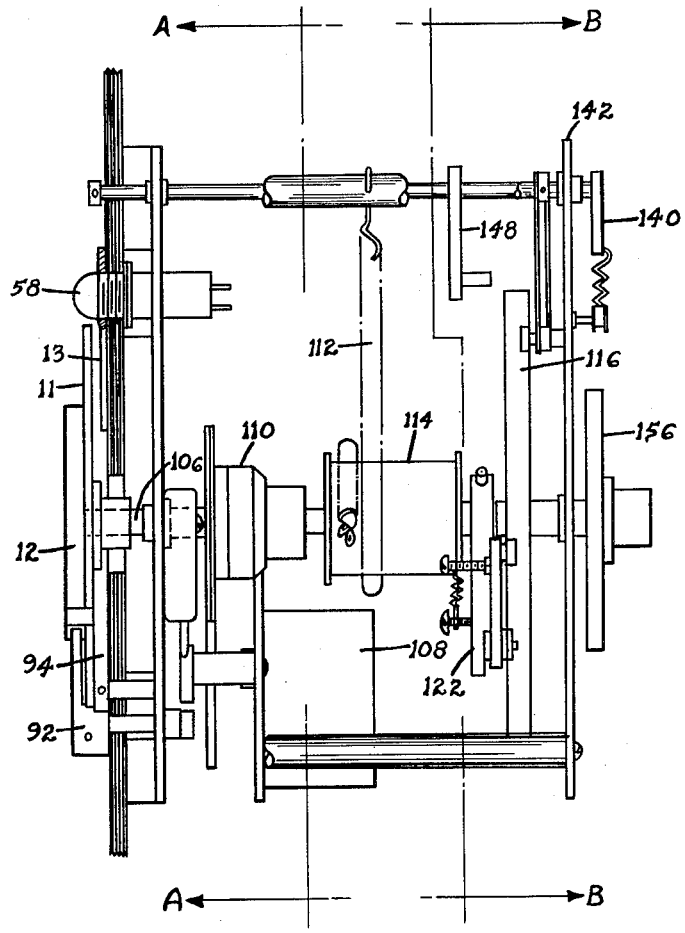
Figure 6:
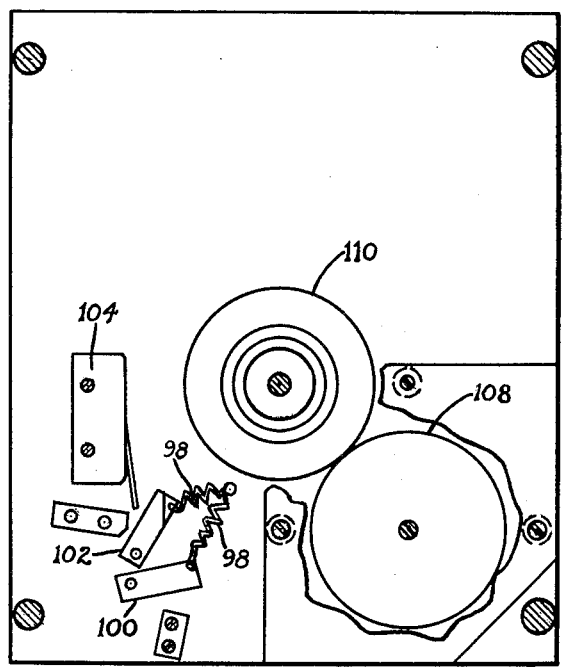

Other objects and many of the attendant advantages of this invention will be readily appreciated as the same becomes better understood by reference to the following detailed description when considered in connection with the accompanying drawings wherein:

FIG. 1 is a pictorial representation of the front panel of an embodiment of the invention which visually demonstrates the automatic channel selection system for a TDC radio transmitter, and FIG. 2 is a schematic diagram of the circuit employed to operationally connect the components of the channel selection system illustrated in FIG. 1, FIG. 3 is a plan view showing a typical relay animation assembly as seen from the rear of the panel, FIG. 4 is a fragmentary plan view of the front panel showing the dial and finger-stock lock, FIG. 5 is a side view showing the dial assembly, FIG. 6 is a cross-section of the dial assembly taken along the line A—A in FIG. 5

Figure 7:
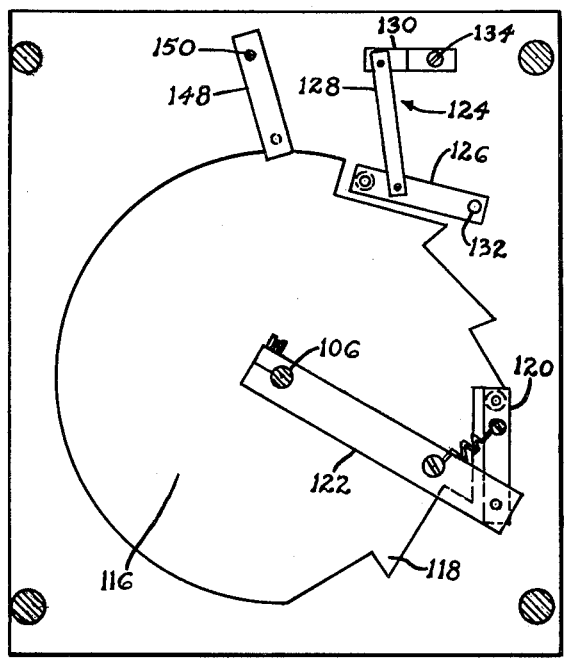
Figure 8:
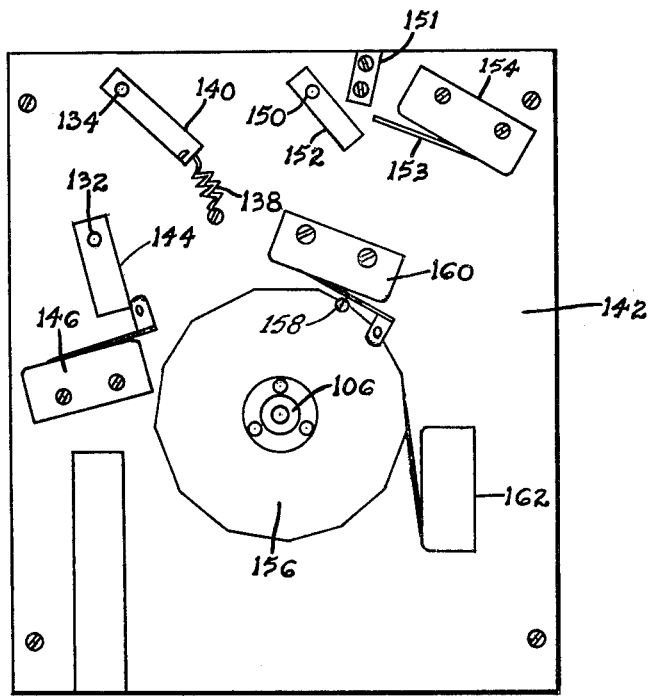
Figure 9:
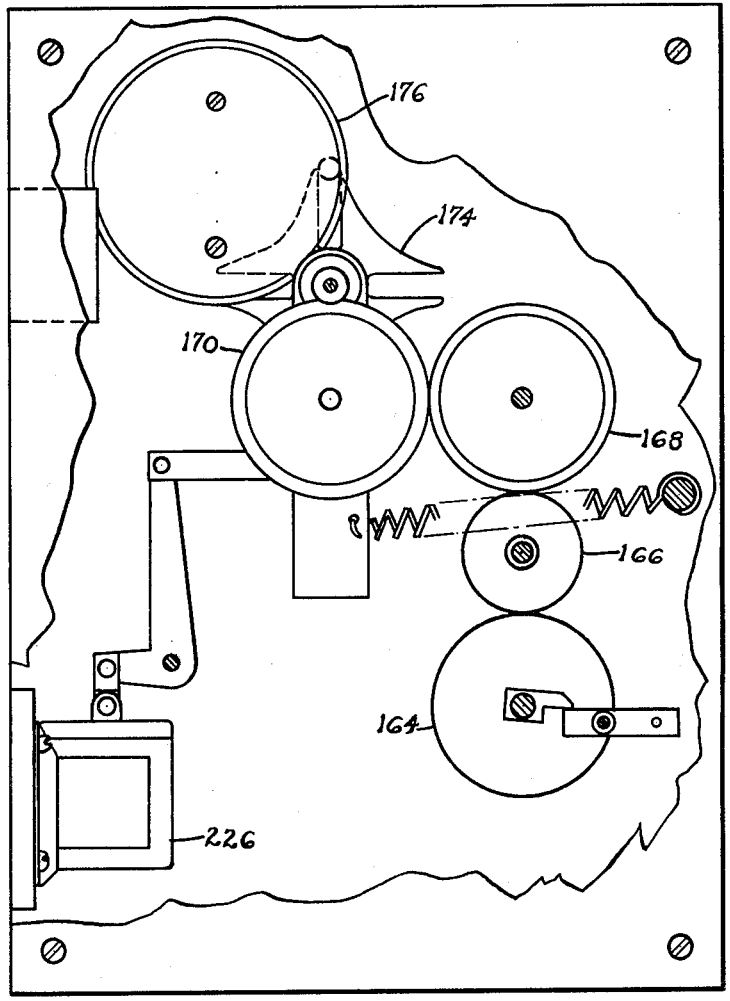
Figure 10:
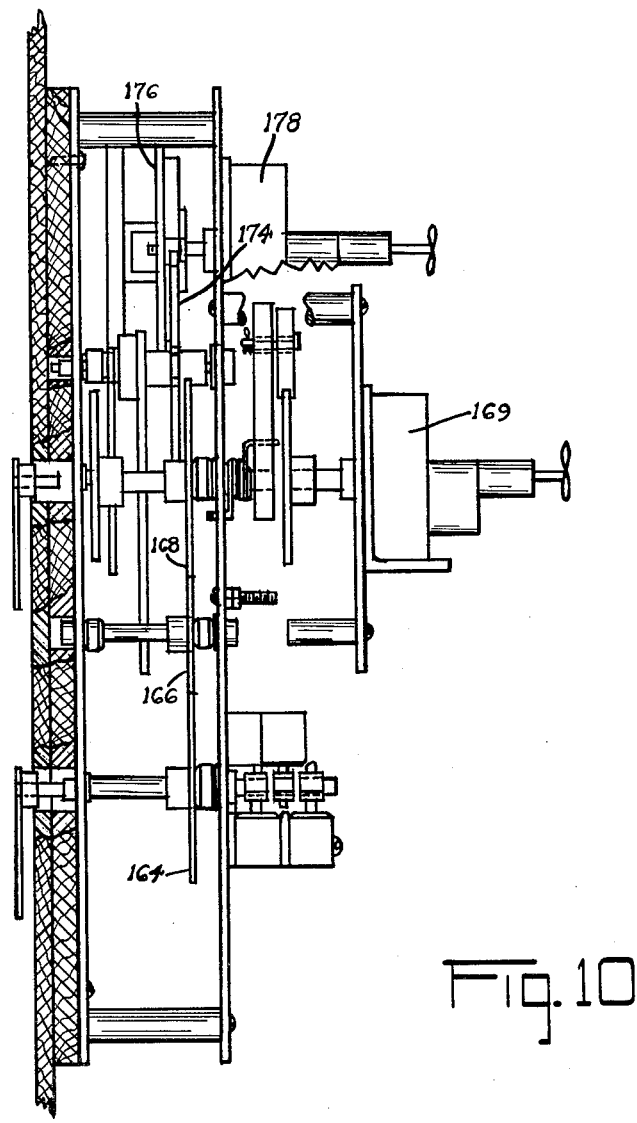
Figure 11:
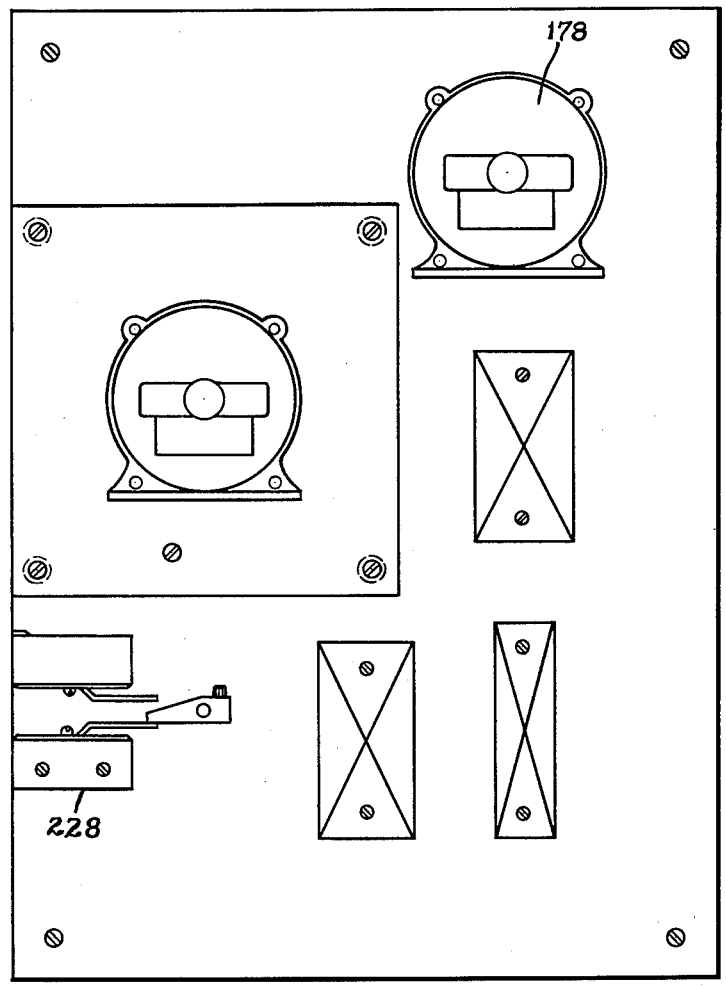
Figure 12C:
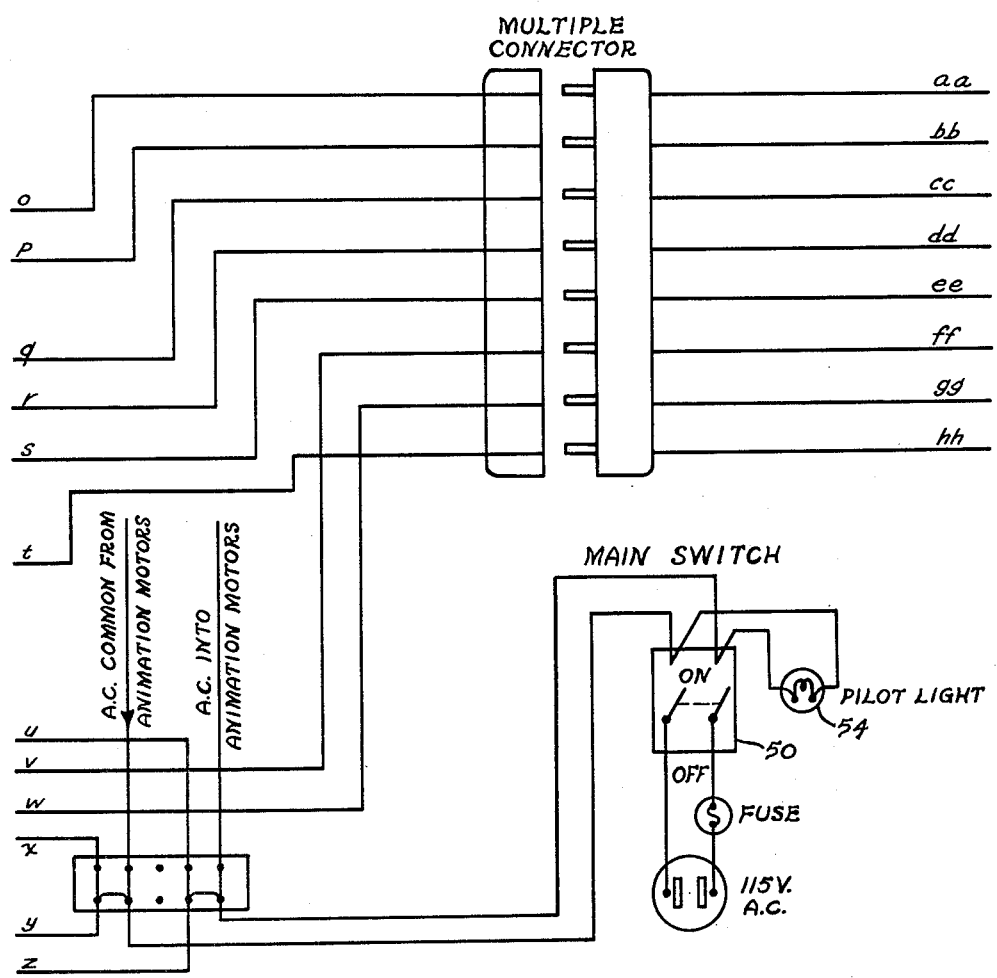
Figure 12D:
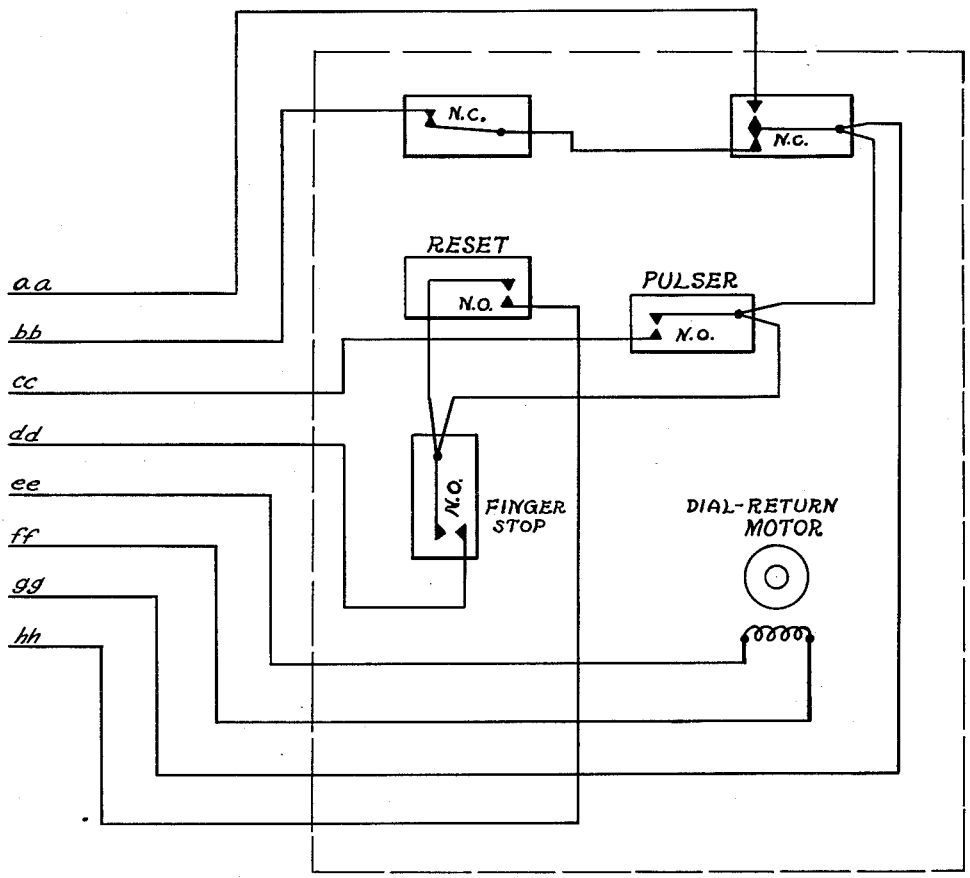
Figure 13C:
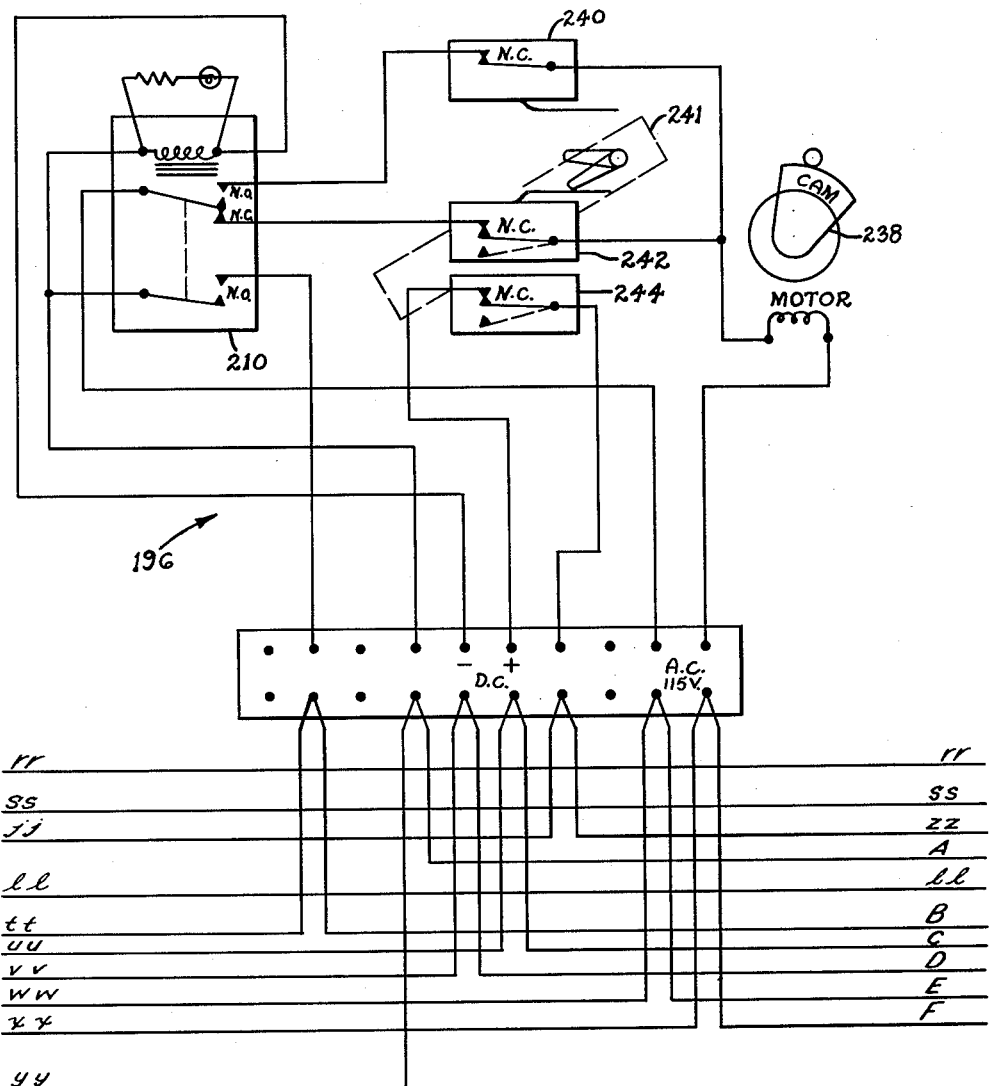
Figure 13E:
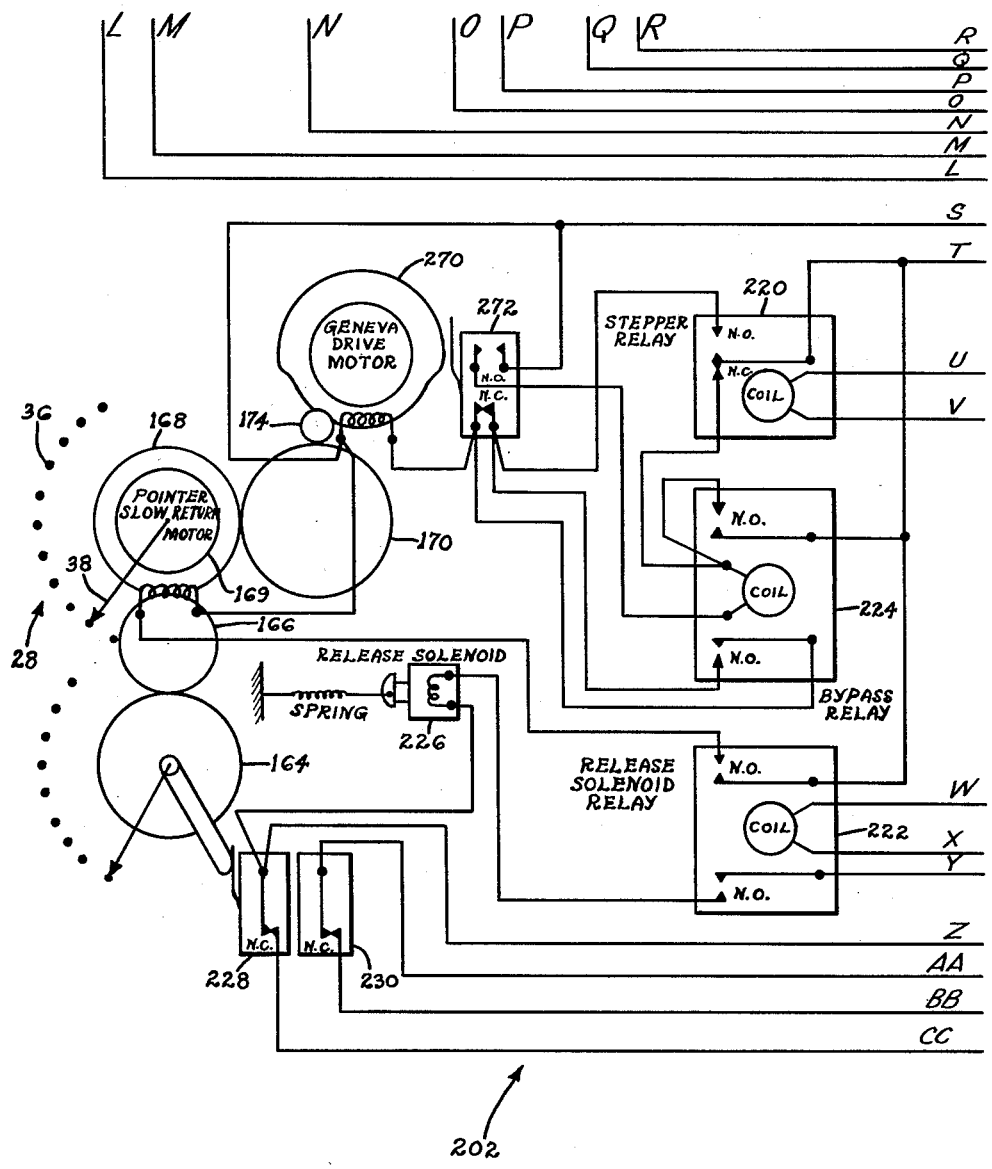
Figure 13F:
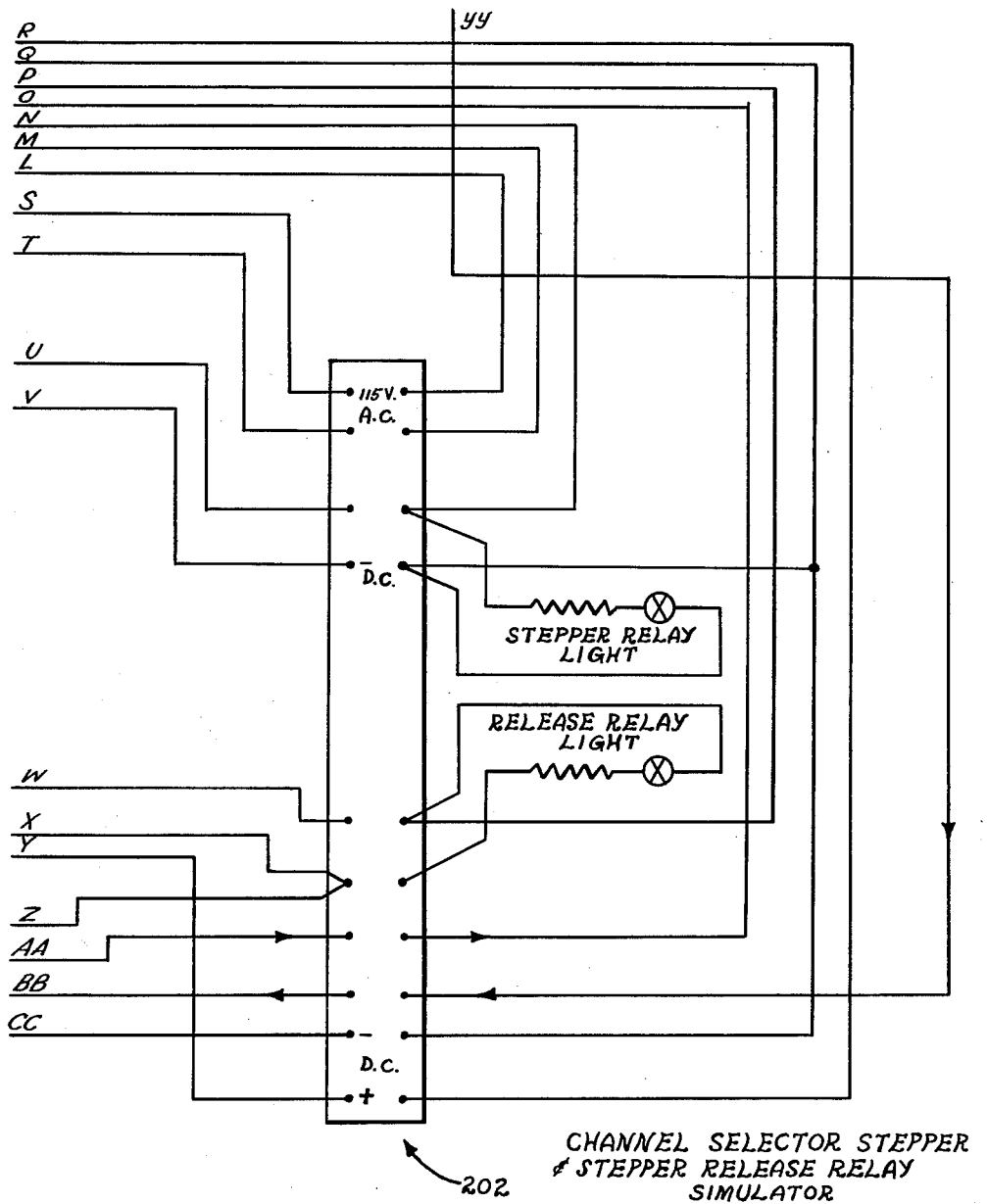

FIG. 7 is a cross-section of the dial assembly taken along the line B—B in FIG. 5, FIG. 8 is a rear view of the dial assembly, FIG. 9 is a plan view of the stepper and release mechanism gearing as seen from the front, FIG. 10 is a side view of the stepper and release mechanism assembly, FIG. 11 is a rear view of the stepper and release mechanism showing the stepping and return motors, FIGS. 12a–d are schematic circuit diagrams showing the lights, relays and switches associated with the telephone dial, and FIGS. 13a–f are schematic circuit diagrams showing the wiring of the relay, relay motor and stepper-and-release mechanism circuits. Corresponding lines in the several drawing figures of FIGS. 12a–12d and FIGS. 13a–13f are identified on the drawings by corresponding lower case letters of the alphabet.

GENERAL

FIG. 1 illustrates an embodiment of the invention which visually demonstrates the operation of the components of a dial-operated, automatic channel selection system. The particular system chosen is that used in the Navy Type TDZ radio transmitter, although the selection of a specific system for demonstration is a matter of choice.

In the TDZ transmitter, there are ten pre-determined frequency channels. The positions of the tuning elements differ for different frequencies and are varied by means of a motor which is controlled by a selsyn. Actuation of this selsyn is effected by a telephone dial-and-relay system. Full details of the TDZ transmitter are available in the "Instruction Book for the Navy Model TDZ Radio Transmitting Equipment," NAVSHIPS 900, 809, published by the Bureau of Ships, Navy Department, in September 1945.

The schematic panel 19 of the visual demonstrator 10 supports schematic and fabricated representations of the components and wiring of the automatic dial system of the transmitter. The components comprise an oversized mock-up of a telephone dial mechanism 12 with a finger-stop lock 14 for holding the dial 11 in the "before-releasing" position, an impulse relay 16, a channel-selector timing relay 18, a channel-selector clearance relay 20, a channel-selector circuit-preparatory relay 22, a channel-selector stepper relay 24, a channel-selector stepper release relay 26, and a pair of stepper-relay wafer simulators 28 and 30.

The relay coils 32 are schematically represented on the panel 19, as are also the interconnecting wires 34 and the step contact terminals 36 on the stepper-relay wafer simulators 28 and 30. The pointers 38 of the wafer simulators 28 and 30 and the relay armature simulators 40 are fabricated parts made from rigid material, such as wood, metal or plastic. Multiple armatures, such as that of the impulse relay 16, are mechanically connected by a rigid armature link 42.

To simulate automatic channel selection from a remote location, a remote telephone dial 44 mounted on a small remote panel 46 may be connected to connection means on the schematic panel 20 by a length of cable 48.

An equipment "On-Off" switch 50 and a "local-remote" control switch 52 are provided, the former permitting application and removal of power and the latter permitting alternative operation of the demonstrator 10 from the local 12 or the remote 44 dial.

A "Power On" indicator lamp 54 lights when power is applied to the demonstrator 10 and relay-energization indicator lamps 56, adjacent to each coil representation, light to indicate simulated application of power to the relay coils 32 with which they are associated. Channel-selection indicator lamps 58 are mounted in an arc concentric with the numbered positions of the local telephone dial 12 to indicate which channel has been dialed. There is a separate indicator lamp 58 for each dial position.

FIG. 2 is a schematic circuit diagram of the components and wiring of the TDZ dial system simulated on the schematic panel 20 of the demonstrator 10. At this point, the events which occur during the operation of the TDZ automatic dial system and are visibly simulated on the panel 20 will be described.

The local telephone dial 12 includes a cam-operated switch 60 behind the dial. This cam-operated switch 60 is composed of two switches in series. One switch 62, a cam-operated pulsing type, is normally closed; the other 64 is normally open. When a channel is dialed, impulse relay 16 is energized. This results from closing the normally-open switch 64 of dial 12, which completes the exciting circuit to impulse relay 16. Impulse relay 16 then energizes channel-selector timing relay 18 which holds in during the entire sequence of operations (in the TDZ transmitter, because of the long time-constant relay employed).

Channel-selector timing relay 18 excites the stepper release relay 26 through normally closed contacts on channel-selector preparatory relay 22 and normally closed contacts on the stepper relay 24. Closing the stepper release relay circuit returns the stepper relay 24 to normal from its previous selecting position. Upon returning to its normal position, the channel-selector stepper relay's normally closed contacts 66 are also returned to their closed positions. This opens the energizing circuit to the stepper release relay 26, rendering it inactive until a new channel is dialed.

When the dial finger-plate is released, its normally closed contacts 62 will break-and-make, thereby pulsing its associated circuit. This break-and-make action is accomplished by a rotating cam in the dial mechanism which opens and closes the normally closed contacts 62 of cam-operated switch 60 a number of times corresponding to the number dialed. The normally open contacts 64 will remain closed, however, until the dial finger-plate has returned to its normal position. These energizing pulses are known as "on-pulses."

After the finger-plate is released, the normally closed contacts 62 of the cam-operated switch 60 are open (first off-pulse) thereby de-energizing impulse relay 16. When impulse relay 16 assumes its normal position, channel-selector clearance relay 20 becomes excited through a set of normally closed contacts 68 on the impulse relay 16 and normally open contacts 70 on the timing relay 18. (All contacts on the timing relay 18 remain closed throughout the remaining channel-selecting sequence of operations by virtue of its long time constant.) At this point, the clearance relay 20 locks its supply through a set of normally open contacts on the circuit preparatory relay 22 and prepares an energizing circuit which will excite the circuit preparatory relay 22 when the impulse relay 16 receives its first on-pulse from the cam-operated switch 60.

As the dial finger-plate travels back to its normal position it sends a series of on-pulses (corresponding in number to the channel dialed) to the impulse relay 16. As the impulse relay 16 receives its first on-pulse, the circuit preparatory relay 22 becomes energized and remains excited throughout the operational sequence. With its supply locked through normally open contacts 70 on the timing relay 18, the circuit preparatory relay 22 prepares a circuit to energize the stepper relay 24 on each subsequent off-pulse to the impulse relay 16. As the stepper relay 24 is successively energized by the number of pulses which have been dialed, its contact arms are stepped to the proper position.

Shortly after the impulse relay 16 receives its last on-pulse, the timing relay 18 (a slow-release relay in the TDZ transmitter) releases and de-energizes the circuit preparatory relay 22 and the clearance relay 20. When the circuit preparatory relay 22 is released, the stepper relay 24 is also de-energized. This final operation restores the circuit to its ready position for transmitting the next channel selection.

In the TDZ transmitter, two banks of the stepper relay 24 are connected to a network of series resistors which compose a D.C. selsyn transmitter. Each bank is connected to one-half of the resistor network which represents one-half of the transmitter. Output from this selsyn transmitter is then distributed to local and remote selsyn receivers which operate their respective channel indicators. A third bank (not shown) of the stepper relay 24 operates the frequency tuning adjustment motor.

Since the present invention is intended for didactic and demonstrational purposes, the components utilized in the TDZ transmitter are replaced by mechanical components and circuitry which permit the operations of the channel selector mechanism to be displayed in proper sequence and at a slower rate than that at which they actually occur.

Each relay armature simulator 40 (FIG. 1) is operated by the action of a cam attached to the shaft of a motor which is energized when the simulated relay is supposed to be energized. Thus, FIG. 3 shows a lever arm 72 secured to and pivoting on a shaft 74 to which one of the relay armatures on the front of the panel 19 is also attached. The end of the lever arm 72 is bifurcated, the lower bifurcation 76 actuating the contact arm 80 of a microswitch 82 when the lever-arm actuating cam 84 on the motor shaft 86 raises the lever arm 72. The upper bifurcation 78 actuates the contact arm 88 of another microswitch 90 when rotation of the cam 84 allows the lever arm 72 to drop. The lever arm 72 may be spring-biased to return it to its original position, if necessary. Of course, a single micro-switch or a plurality of microswitches may be employed as the specific circuit demands, and the cam and lever arrangement may be such as to raise the lever 72 above the horizontal level as would be necessary in the case of the armature simulator of the channel-selector clearance relay 20, for example.

The closure of one of the microswitches actuates a relay which in turn energizes the motor associated with the next relay action which must occur. Thus, each step in the channel selection process occurs slowly and sequentially.

The relays on the front panel 19 are merely representations or simulations of the relays present in the TDZ transmitter. The demonstrator is also provided with operational relays located on the rear of the panel for energizing the motors.

STRUCTURE OF SPECIFIC COMPONENTS

The telephone dial mechanism 12 (see FIG. 4) is provided with channel-selection indicator lamps 58, a dial 11, a number plate 13 and a finger-stop lock 14, all located in front of the panel 19.

The finger-stop lock 14 comprises a finger-stop lever 92 and a locking lever 94. The levers 92 and 94 are reciprocally notched, fitting together at the notched areas. When a number is dialed, the operator's finger forces the finger-stop lever 92 to the left as seen in FIG. 4 and allows the spring-biased locking lever 94 to rotate to its right past the notch in the finger-stop lever 92. At the same time, the hook 95 at the other end of the locking lever 94 is rotated into contact with pins affixed to the rear of dial 11 thereby preventing the dial 11 from returning to its original position. The locking lever 94 prevents the finger-stop lever 92 from returning to its original position. The dial 11 is allowed to return to its original position by exerting manual force on the locking lever 94 to bring the notch into the complementary indentation on the finger-stop lever 92. A spring attached to lever 100 (see FIG. 6) pulls the finger-stop lever 92 into place as the locking lever 94 is forced up.

The biasing springs 98, shown in FIG. 6, are attached to levers 100 and 102 behind the panel 19. Lever 100 is affixed to and rotated by the shaft to which the finger-stop lever 92 is attached and lever 102 is affixed to and rotated by the shaft to which the locking lever 94 is attached. When the locking lever 94 is rotated by the action of the biasing spring on lever 102, the contacts of the finger-stop microswitch 104 are closed.

The dial 11 is also connected to a shaft 106 which is geared to be rotated by a dial return motor 108 through a free-wheeling clutch 110 (see FIG. 5). The dial motor 108 rotates in a counterclockwise direction as seen from the front of the panel. However, no force is applied to rotate the dial 11 until the dial 11 has been manually rotated clockwise. As the dial 11 is rotated clockwise, a clutch-tensioning spring 112 is wound around a spool or drum 114 which is affixed to and rotated by the dial shaft 106. The tensioned spring 112 applies pressure to the clutch 110 thereby enabling the motor 108 to apply torque to the dial 11 to turn it in a counter clockwise direction when the finger-stock lock 14 is released.

FIG. 7 illustrates a toothed wheel 116 which bears a plurality of teeth 118 at least equal in number to the dial digits (only a few of the teeth are illustrated). The angular spacing between any two successive teeth 18 is the same as that between any two successive dial digits. A pawl 120 engages the teeth 118 and is pivoted on and driven by a pawl lever 122 which is affixed to and rotated by the dial shaft 106.

The pawl lever 122 is rotated past a number of teeth 118 corresponding to the number which is dialed. When the dial 11 is released, the pawl 120, driven by the pawl lever 122, rotates the toothed wheel 116 counter clockwise until the pawl returns to its original position. The number of teeth 118 which rotate past a fixed spot is equal to the dial number which was selected.

When the pawl lever approaches its original position, it contacts lever arm 148 pushing it to the left, as seen in FIG. 7, until lever arm 152 (FIG. 8) strikes a stop 151. The lever arm 152 contacts the pressure arm 153 of microswitch 154 at this time to open the energization circuit of the impulse relay simulator 194.

As the toothed wheel 116 is rotated, the teeth 118 strike the lower arm 126 of a linkage system 124. The lower arm 126 pivots on a shaft 132 when a tooth 118 strikes it, thereby driving the connecting arm 128 and the upper arm 130 in an upward direction. The upper arm 130 is attached to a shaft 134 which extends through the panel 19. Contact arm simulator 136 of the normally closed section of the telephone dial switch 60 is also attached to the shaft 134 and lifting of the upper arm 130 by a tooth 118 lifts the contact arm 136. This visually illustrates the breaking of the energization circuit of the impulse relay 16 (FIG. 2).

The contact arm simulator 136 and linkage system 124 are returned to their original positions after passage of a tooth 118 by pressure on shaft 134. This pressure is exerted by a spring 138 (see FIG. 8), one end of which is attached to the rear of mounting plate 142 of the dial mechanism 12 and the other end to a lever arm 140 which is affixed to the shaft 134.

The lifting of the lower arm 126 of the linkage system 124 rotates shaft 132 and also lever arm 144 (see FIG. 8). The movement of lever arm 144 brings it into contact with the pressure arm of microswitch 146 (see FIG. 12) opening the normally closed contact and closing the normally open contact.

Turning the telephone dial 11 clockwise also rotates pawl lever 122 in the same direction. This releases lever arm 148 (see FIG. 7) permitting it to move in a clockwise direction, thereby rotating the shaft 150 to which it is affixed. The contact arm simulator 137 of the normally open section of the telephone dial switch (see FIG. 4), which is also affixed to shaft 150, is thereupon rotated downward, indicating that this section of the switch is closed. At the same time, a lever arm 152 attached to the same shaft at the rear of the dial mechanism 12 (see FIG. 8) is rotated in a downward direction, thereby breaking contact with microswitch 154 and permitting its normally closed contacts to make.

The final item attached to the telephone dial shaft 106 is a polygonal cam wheel 156 (see FIG. 8). The intersections of the sides of the cam wheel 156 correspond in number and position to the teeth 118 of the toothed wheel 116. The cam wheel 156 is securely attached to the dial shaft 106 and rotates with the latter at all times. A microswitch 162, called the pulser microswitch 162, is arranged to have its contacts closed upon application of pressure by the raised points of the cam wheel 156.

When the telephone dial 11 returns to its original position, a contact peg 158 affixed to the periphery of the cam wheel 156 actuates another microswitch 160 called the reset microswitch, closing its contacts.

Referring to FIG. 9, the pointers 38 of the stepper-relay wafer simulators 128 and 130 are advanced by a gear train comprising gears 164, 166, 168, 170 and 174. Gear 170 is driven by a Geneva gear 174 which, in turn, is driven by gear 176, the latter being affixed to the shaft of stepper-relay-simulator drive motor 178. The gears and contact arms are also sketchily illustrated in FIG. 12. Each rotation of the drive motor 178 rotates the Geneva gear 174 a quarter turn and advances the pointers 38 one step.

The operation of stepper and release relays 220 and 222 of the stepper and stepper-release-relay simulator 202, the release solenoid, the return motor and their associated microswitches 272, 228 and 230 will be described subsequently.

FIGS. 12a–d show the wiring diagram for the power supply, channel selector indicator lamps 58, relays and switches associated with the local and remote telephone dials. The operation of the invention will be explained by describing what occurs when a channel is dialed.

When the device is plugged into a source of A.C. supply and the "on-off" and "local-remote" switches 50 and 52 are thrown to the "on" and "local" positions, respectively, A.C. and D.C. supply voltages become available. The A.C. voltage is applied to the dial return motor 108 which rotates continuously.

D.C. voltage is applied to the stepping coil 182 of a stepper relay 180 which acts as a multi-contact switch for energizing the correct channel-selection indicator lamp 58. Thus, if channel five is dialed, five pulses of D.C. voltage are applied to the stepping coil 182 through microswitch 162. Microswitch 162 is normally open but is closed five times by the action of the polygonal cam wheel 156. Energization of the stepping coil 182 steps the contact arm 186 of the stepping relay 180 to position 5, thereby connecting one terminal of the channel 5 indicator lamp 58 to the negative side of the D.C. voltage source.

When the finger rotating the dial 11 strikes the finger-stop lever 92 of the finger-stop lock 14, finger-stop microswitch 104, which is normally open, is closed. Positive D.C. is then applied through the normally closed contacts of the dial-light-relay deenergizing relay 192 to the coil of the dial light relay 190. This relay 190 applies positive D.C. to the channel 5 indicator lamp, thereby lighting it. At the same time, positive D.C. voltage is also applied to the coil of relay 190 to maintain it in its energized condition even though the pressure which closed the finger-stop microswitch 104 is released. The third act performed by the relay 190 is the breaking of the connection between the cam wheel pulser microswitch 162 and the stepping coil 182 of the stepper relay 180 by opening its normally closed contacts. Thus, the stepper relay 180 cannot be pulsed again until the relay 190 is deenergized.

When the finger-stop lock 14 on the telephone dial mechanism 12 is manually released, the dial 11 rotates back to its original position. At this point, the contact peg 158 on the periphery of the cam wheel 156 closes the normally open contacts of the reset microswitch 160. This applies positive D.C. voltage to the stepper-relay release coil 184 through the release coil switch 188. The contacts of the release coil switch 188 are closed when the contact arm 186 is not on its "off" position. Application of D.C. voltage to the release coil 184 returns the contact arm 186 to its "off" position, thereby forcing open the contacts of the release coil switch 188 and breaking the connection to the positive side of the D.C. supply voltage.

Closing the contacts of the reset microswitch 160 also applies positive D.C. to the dial-light-relay deenergizing relay 192, opening its normally closed contacts. This deenergizes the dial light relay 190 by removing D.C. voltage from its coil.

CHANNEL SELECTOR RELAY SIMULATORS

FIGS. 13a–f show the wiring of the equipment employed to simulate the actions of the relays utilized in the channel selection system of the TDZ transmitter.

The relay simulators comprise one or more relays, a motor, a cam connected to be rotated by the motor shaft, a lever arm which is raised and lowered by action of the cam, and microswitches whose contacts are made and broken by action of the lever arm. The relays and the microswitches are arranged circuitwise so that the actions which culminate in advancement of the pointers of the stepper-relay wafer simulators 28 and 30 (and application of power to the selsyn receivers in the actual TDZ transmitter) occur in slow motion and in proper sequence.

The coils of all the relays which form component units of the relay simulators have one side connected permanently to the negative side of the D.C. voltage supply. Negative D.C. is also applied to the lights on the front panel which indicate energization of the relays with whose coil simulations they are associated and to the release solenoid 226 for the contact arms of the stepper relay wafer simulators 28 through the normally closed contacts of microswitch 228. Negative D.C. is also applied to the coil of release solenoid relay 222 through microswitch 228.

SEQUENCE OF OPERATIONS

The sequence of events which culminates in a one-step advancement of the pointers 38 will now be described in relation to four basic signals which initiate four basic events.

(A) *Clearance Signal*

When a specific channel is dialed, the telephone dial 11 is turned clockwise and locked in place. As soon as the dial 11 is displaced from its zero position, microswitch 154 makes contact energizing the coils of relays 204 and 206 which are part of the impulse relay simulator 194. Energization of relay 206 applies A.C. through microswitch 232 to the motor 231, rotating it and thereby raising the bifurcated lever arm 233 by the action of the cam 84.

Raising the lever arm 233 causes the upper bifurcation to break the normally closed contacts of microswitch 232 (the upper limit switch) which stops the motor rotation and to make the normally open contacts of microswitch 236 whereby the coil of relay 210 (a component of the channel-selector timing relay simulator 196) is energized.

A.C. is now applied to motor 238 through microswitch 240 (upper limit switch) until the rising lever arm 241 breaks the normally open contacts of this microswitch. Raising the lever arm 241 applies positive D.C. to the coil of the stepper release relay 222 of the channel-selector stepper relay simulator 202 and to the stepper-release-relay indicator lamp.

Energization of the stepper release relay 222 applies positive D.C. to the coil of the release solenoid 226 and A.C. to the pointer slow return motor 169. Actuation of the armature of the release solenoid 226 releases the clutch between the Geneva drive motor 270 and the gearing system which drives the pointers 38, thereby permitting the slow return motor 169 to couple to the gearing system and drive the pointers 38 to their zero position.

Driving the pointers 38 to their zero position breaks the normally closed contacts of microswitches 228 and 230. This breaks the negative D.C. lead to the release solenoid 226 and removes positive D.C. from the coil of relay 210, deenergizing the solenoid and the relay and recoupling the Geneva drive motor 178 to the pointer gearing system.

When the dial 11 is rotated clockwise, positive D.C. pulses are applied to the coil 182 of the stepper relay 180 through the pulser microswitch 162, so that the contact arm 186 is stepped to the proper contact. When rotation of the dial 11 is arrested by the finger-stop lever 92, finger-stop microswitch 104 is closed, energizing the dial light 190. This energizes the proper indicator lamp 58 through the normally open contacts of the dial light relay 190 and the contact arm 186 of the stepping relay 180.

(B) *First "Off" Pulse*

After the pointers 38 have returned to their zero positions, the dial 11 is permitted to rotate counterclockwise by manually releasing the locking lever 94 of the finger-stop lock 14. The dial shaft also rotates the toothed wheel 116 in the counterclockwise direction. The first tooth 118 comes into contact with the linkage system 124 and raises it, thereby opening the normally closed contacts and closing the normally open contacts of microswitch 146.

Opening the normally closed contacts of microswitch 146 deenergizes relays 204 and 206 of impulse relay simulator 194. This rotates motor 231 and cam 84 by applying A.C. thereto through microswitch 234 (lower limit switch) and allows lower arm 233 to descend. The contacts of the lower limit switch 234 are opened, breaking the motor circuit and stopping rotation of the motor 231.

Relay 210 in the channel-selector timing relay simulator 196 remains energized as a result of the application of positive D.C. through its holding contacts and the normally open contacts of microswitch 146.

Relay 212 in the channel-selector clearance relay simulator 198 is energized through microswitch 244 and through the normally closed contacts of relay 204. This rotates motor 268 and raises the lever arm 263 until the normally closed contacts of the upper limit switch 262 are opened.

If, at this time (i.e., the normally closed contacts of the upper limit switch 262 are opened), the channel-selector circuit preparatory relay simulator 200 is not cleared (i.e., its lever arm is raised), positive D.C. is supplied to relay 216 in the circuit preparatory relay simulator 200 via microswitches 246 and 260. Energization of relay 216 energizes relay 214 which applies A.C. to motor 258. This rotates the motor 258 and brings down the lever arm.

(C) First "On" Pulse

When the apex of the first tooth passes the linkage system 124, the latter drops. The consequent release of pressure permits the normally closed contacts of microswitch 146 to make, thereby energizing relays 204 and 206 in the impulse relay simulator 194.

Energization of relay 204 while the lever arm 263 of the clearance relay simulator 198 is raised (i.e., while clearance relay simulator 198 is energized) applies positive D.C. through the normally open contacts of relay 204 and through the normally open contacts of microswitch 260 to the coil of relay 218 in the circuit preparatory relay 200. This energizes the motor relay 214 causing motor 258 to rotate whereby lever arm 251 is raised. Release of pressure on microswitch 256 permits its normally closed contacts to make. Release of pressure on microswitch 254 opens its normally open contacts, removing positive D.C. from the coil of relay 212. This deenergizes the clearance relay simulator 198, allowing lever arm 263 to descend.

Lever arm 251 is maintained in a raised position because, although relay 218 is deenergized when the clearance relay simulator 198 is deenergized, relay 216 becomes energized by the closing of microswitch 246 when lever arm 251 is raised.

(D) Second "Off" Pulse

Pressure from the second tooth of the rotating toothed wheel 116 again raises the linkage system 124 and opens the normally closed contacts of microswitch 146. This deenergizes relays 204 and 206 of the impulse relay simulator 194, opening the normally closed contacts of relay 204 and allowing the normally closed contacts of microswitch 236 to make.

The first action energizes relay 216 in the circuit preparatory relay simulator 200 which, in turn, energizes relay 214 and starts motor 258. Rotation of motor 258 lowers lever arm 251. It should be noted here that deenergization of relay 204 while lever arm 251 is in its raised position deenergizes relay 210 in the timing relay simulator 196. This is because the normally open contacts of relay 204 open before lever arm 251 can drop. Thus, there is an instant at which one component in each of the two supply circuits to the coil of relay 210 (i.e., the normally open contacts of relay 204 and the normally closed contacts of microswitch 248 in the circuit preparatory relay simulator 200) is open.

Allowing microswitch 236 to close applies positive D.C. to the coil of the stepper relay 220 through microswitch 256 in the circuit preparatory relay simulator 200. This initiates the sequence of operations which advances the pointers 38 one step.

The shaft of the Geneva drive motor 178 which advances the pointers 38 is coupled to a circular cam 270 having a raised circumferential portion covering somewhat more than 180°. When the pointers 38 are at their zero position, the raised portion of the cam 270 contacts the pressure arm of microswitch 272, opening its normally closed contacts and closing its normally open contacts.

Thus, while the cam 270 is in contact with the pressure arm of microswitch 272, A.C. is applied to energize the coil of bypass relay 224 through the normally closed contacts of stepper relay 220 and the normally open contacts of microswitch 272. Energization of relay 224 bypasses the normally closed contacts of microswitch 272 by shorting them out, thereby allowing the Geneva drive motor 178 to rotate as soon as A.C. is applied through the energization of the stepper relay 220; and provides a holding circuit for itself independent of the state of stepper relay 220 as long as cam 270 is in contact with the pressure arm of microswitch 272.

Thus, when stepper relay 220 is energized, the Geneva drive motor 178 begins to rotate. When the rear edge of the raised circumferential portion 270 of the cam 178 clears the pressure arm of the microswitch 272, the bypass relay 224 is deenergized by the opening of the normally open contacts of the microswitch 272. However, the motor 178 continues to rotate since A.C. is now supplied through the normally open contacts of the stepper relay 220 on the normally closed contacts of microswitch 272. The Geneva drive motor 178 continues to rotate until the descent of lever arm 251 in the circuit preparatory relay simulator 200 breaks the normally closed contacts of microswitch 256, at which time the stepper relay 220 is also deenergized. The speed of the Geneva drive motor 178 is such that the cam 270 completes a full revolution during the time of descent of lever arm 251. The pointers 38 are moved one step by this complete revolution of the Geneva drive motor 178.

As the toothed wheel 116 continues its rotation, more "on" and "off" pulses are transmitted to the relays and the pointers 38 are advanced by a number of steps corresponding to the dialed channel number.

When the dial 11 returns to its original position, lever arm 148 is contacted and the normally closed contacts of microswitch 154 are opened. At the same time, the contacts of the reset microswitch 160 are closed by pressure from the contact peg 158 which is affixed to the polygonal cam wheel 156. This last action energizes the dial-light-relay deenergizing relay 192 which, in turn, deenergizes the dial light relay 190 and removes power from the indicator lamps 58. Positive D.C. is also applied to the release coil 184 of the stepper relay through the release coil switch 188 which is closed. This brings the contact arm back to its zero position, opening the release coil switch 188 and removing power from the release coil 184.

Obviously many modifications and variations of the present invention are possible in the light of the above teachings. It is therefore to be understood that within the scope of the appended claims the invention may be practiced otherwise than as specifically described.

I claim:

1. A device for visually demonstrating the operation of a dial-operated, frequency-channel selector system for a TDZ-type radio transmitter comprising, in combination: support means formed with at least one flat, visible area; a plurality of elements affixed upon said visible area representing the different components of said selector system, said elements comprising a fabricated simulation of a telephone dial, simulations of the relays of said selector system, and a simulation of the contacts and contact arm of a stepping relay, said fabricated simulation of a telephone dial having a finger-stop dial-locking device and switch means operatively associated therewith, said relay simulations having coils delineated upon said visible area and armatures represented by movable rods, said contacts of said stepping relay being represented by markings upon said visible area and said contact arm being represented by a fabricated movable pointer; markings upon said visible area delineating the interconnections between the electrical contacts of said telephone dial and said relay simulations; and means affixed to said support means for automatically operating the moving parts of said elements, said last-named means including switch means, relays and motive means, said motive means adapted to move said armatures of said relay simulations, said pointer and said telephone-dial switch means and further adapted to actuate and deactuate said switch means, said relays and switch means arranged in electrical circuits adapted to automatically operate the moving parts of said elements in proper duplication of the operation of said components in said selector system, but at a slower rate, so that the sequence of operation may be observed.

2. A device as set forth in claim 1, wherein said motive means for each relay simulation comprises an electrical motor, a cam rotated by said motor, and a lever having a bifurcated end raised and lowered by the action of said cam, the raising and lowering of said bifurcated lever resulting in actuation and deactuation of the switch means associated with that relay simulation.

3. A device as set forth in claim 1, wherein said motive means for said movable pointer comprises a drive motor, a Geneva gear driven by said drive motor, a gear train driven by said Geneva gear and driving said pointer, a return motor for bringing said pointer back to its original position, a clutch for decoupling the drive motor and coupling the return motor to said gear train, a solenoid arranged to actuate said clutch, and associated relays, switches and a cam driven by said drive motor arranged in electrical circuit to activate said motors and solenoid to advance said pointer the proper number of steps and to bring it back to its original position at the proper time.

References Cited in the file of this patent

UNITED STATES PATENTS

| | | |
|---|---|---|
| 2,203,594 | Daugherty | June 4, 1940 |
| 2,236,217 | Manuel | Mar. 25, 1941 |
| 2,458,550 | Baulch | Jan. 11, 1949 |
| 2,470,434 | Eckman et al. | May 17, 1949 |
| 2,516,780 | Ludwig | July 25, 1950 |
| 2,973,586 | Robertson | Mar. 7, 1961 |